United States Patent [19]

Miesch

[11] 4,262,400
[45] Apr. 21, 1981

[54] SUPPORT MEMBER

[75] Inventor: Hans Miesch, Zurich, Switzerland

[73] Assignee: Escher Wyss Limited, Zurich, Switzerland

[21] Appl. No.: 58,457

[22] Filed: Jul. 18, 1979

[30] Foreign Application Priority Data

Aug. 4, 1978 [CH] Switzerland ................. 8351/78

[51] Int. Cl.³ ............................................. B21B 31/32
[52] U.S. Cl. ............................................. 29/116 AD
[58] Field of Search ...... 29/116 AD, 113 AD, 116 R, 29/113 R; 198/780, 825; 193/37

[56] References Cited

U.S. PATENT DOCUMENTS

| | | | |
|---|---|---|---|
| 3,430,319 | 3/1969 | Skaugen | 29/116 AD |
| 3,846,883 | 11/1974 | Biondetti | 29/116 AD |
| 4,064,607 | 12/1977 | Wolf | 29/116 AD |
| 4,091,517 | 5/1978 | Lehmann et al. | 29/116 AD |

Primary Examiner—James Kee Chi
Attorney, Agent, or Firm—Robert A. Ostmann

[57] ABSTRACT

In a support member for a deflection-correcting, pressure compensating or pressure adjusting roller which is provided between a stationary carrier and a roller shell mounted so as to be rotatable about the carrier, in order to support the roller shell by being designed to receive a force acting radially from the carrier to the roller shell and transmit this force to the roller shell via its head portion facing the roller shell and a film of fluid located between the head portion and the roller shell, a space is left free beneath the head portion and is bridged by the head portion so that a flux of the force which is to be transmitted is guided around the free space to the head portion outside the line of action of the force.

As a result of this guiding of the flux of force, the bridge-shaped head portion is elastically adapted to the radius of the roller shell which may increase during operation of the roller.

6 Claims, 4 Drawing Figures

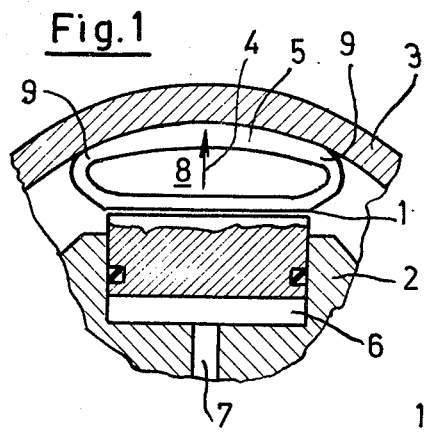
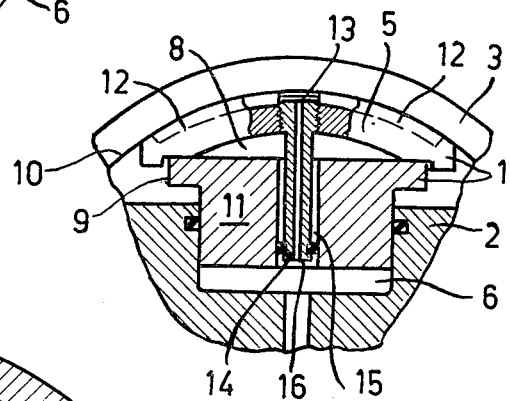
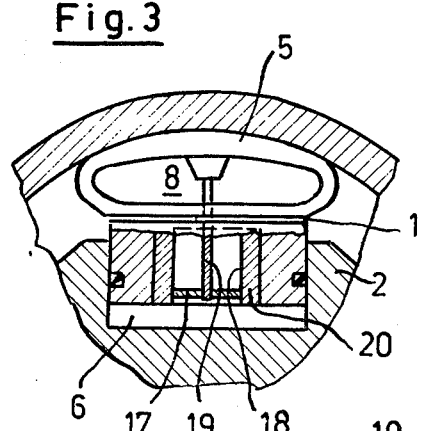
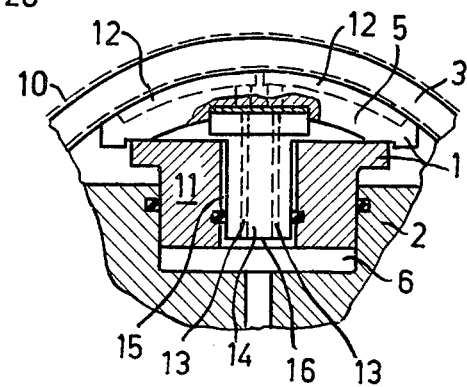

SUPPORT MEMBER

BACKGROUND OF THE INVENTION

The invention relates to a support member which is provided between a stationary carrier and a roller shell arranged so as to be rotatable about the carrier, the support member being intended to support this roller shell by being designed to receive a force acting radially from the carrier towards the roller shell and transmit this force to the shell via a head portion of the support member facing the roller shell and a film of fluid provided between the head portion and the roller shell.

Support members of this kind are used in so-called deflection correcting, pressure-compensating or pressure adjusting rollers and are described, for example, in U.S. Pat. No. 3,802,044. The head portion of the support member is circular or rectangular in outline and, viewed in cross section to the roller axis, its surface facing the roller shell has approximately the same radius as the inner wall of the roller shell.

It has been found that, particularly when a considerable force acting on the inner wall of the roller shell is applied and more particularly when the roller shell is elastic, this roller shell becomes deformed and then has a larger radius, on average, in the region of the head portion of the support member than the head portion. Accordingly, the gap between these two surfaces is altered, this gap being intended for the hydrodynamically or hydrostatically produced film of fluid. The change in the gap has a detrimental effect on the film of fluid and its intended action and undesirable friction may occur locally between the head portion of the support member and the inner wall of the roller shell, which may in turn damage the support member and/or the roller shell.

SUMMARY OF THE INVENTION

The aim of this invention is to maintain an effective film of fluid between the head portion of the support member and the inner wall, even if during operation the roller shell deviates from its original cylindrical form under the effect of the force applied.

This aim is achieved, with the support member of the kind described at the beginning, in that, according to the invention, a space is left free in the support member below the head portion, this space being bridged by the head portion, so that a flux of the force which is to be transmitted is guided round this free space to the head portion, outside the line of action of the force.

When guided in this way, the force acts on the points of abutment of the bridge-like head portion which is thereby elastically deformed, i.e. deflected, since it is pressed, at the points of abutment, towards the inner wall of the roller shell, so that the surface of the head portion which faces the roller shell is shaped to fit the momentary form of the roller shell. The film of fluid remains effectively distributed in the desired layer thickness in the gap between the head portion of the support member and the inner wall of the roller shell.

With a hydrostatic support member having at least one hydrostatic pocket in the head portion, this pocket being connected by a feed line passing through the support member to a hydrostatic pressure chamber in the carrier serving to actuate the support member, it is proposed according to the invention that the feed line be passed to the pressure chamber through or around the free space and be constructed so as to follow the deflections of the head portion positively.

According to a preferred embodiment, this is achieved by the fact that the feed line is housed in a tube section attached to the head portion and leads back to the pressure chamber through the free space, whilst, for the tube section, a bore extending from the pressure chamber to the free space is provided in the support member, the tube section being displaceably guided in this bore and sealed off so that any flow from the pressure chamber into the free space is prevented.

BRIEF DESCRIPTION OF THE DRAWING

The object of the invention is hereinafter described more fully with reference to some exemplary embodiments shown in the drawings, wherein:

FIGS. 1 to 4 each show an exemplary embodiments, viewed in partial axial cross section through a roller.

DESCRIPTION OF THE PREFERRED EMBODIMENTS

All four Figures show a support member 1, partially in section, which is mounted between a stationary carrier 2 and a roller shell 3. The roller shell is mounted so as to be rotatable about the carrier. The roller is one which, with a mating roller, forms a gap in which goods, e.g. a length of goods, are treated with pressure, and which is known as a deflection-correcting, pressure-compensating or pressure adjusting roller. The support member 1 is provided in known manner along the gap between the co-operating rollers so as to support the roller shell 3.

The support member is designed to receive a force acting radially from the carrier 2 to the roller shell. The line of action of this force is shown by arrow 4 in FIG. 1. This force is transmitted, via a head portion 5 of the support member facing the roller shell 3 and via pressure in a film of fluid (not shown) located between the head portion and the roller shell, on to the roller shell. In all the embodiments, a hydraulically operated support member has been used as an example. In the carrier 2 there is provided a pressure chamber 6 which is acted upon by a pressure fluid via a pressure line 7. In order to receive the force which is to be transmitted, the support member is constructed like a piston in relation to the pressure chamber 6.

A space 8 bridged by the head portion 5 is left free in the support member, below the head portion 5 which faces the roller shell. The flux of the force which is to be transmitted leads to the head portion outside the line of action 4 of the force around the free space 8 to the points of abutment 9 of the bridge-like head portion 5. This head portion 5 deflects under the effect of the force and is thus continuously adapted to the form of the roller shell 3 which varies during operation according to the pressures applied. An example of the altered form of the roller shell is shown by a broken line 10 in FIG. 4.

In the exemplary embodiments shown, the free space 8 is tunnel-shaped. It extends below the head portion through the support member parallel to the axis of the carrier 2 or the axis of the roller shell 3 and is open at both ends. However, the invention also applies to any conceivable embodiment, in which, for example, the free space could be made rotationally symmetrical with the line of action of the force to be transmitted and could be sealed off from the environment.

FIGS. 2 and 4 each show a support member which is subdivided. The first part consists of the head portion which is bridge-like in construction and is arranged to be convex at right angles to the longitudinal axis of the carrier 2. A second part 11 of the support member 1 is, on the one hand, associated in the manner of a piston with the pressure chamber 6 to receive the force proceeding from the carrier and, on the other hand, it is adapted to carry the first part, namely the bridge-shaped head portion 5. Preferably, as shown in FIGS. 2 and 4, the head portion 5 is movably supported on the second, supporting part 11, at the points of abutment 9 of its bridge-like profile. The free space 8 in the support member 1 is bounded by the first part, the head portion 5, and the second part 11, and is defined between them.

In a hydrostatic support member as shown in FIGS. 2 and 4, the head portion 5 has at least one hydrostatic pocket 12. In the exemplary embodiment shown, four hydrostatic pockets 12, shown by dotted lines, are provided in the head portion. To supply the pockets 12 with the pressure fluid, a feed line 13 is provided which passes from the appropriate pocket 12 through the support member to the pressure chamber 6 which serves to actuate the support member. The feed line 13 passes through the free space 8 and is constructed to adapt positively to the deflections of the head portion 5. Preferably, the feed line 13 is housed in a tube section 14 which is attached to the head portion 5, e.g. screwed thereto. The tube section 14 leads through the free space 8 back to the pressure chamber 6 through a bore 15 provided in the support member, this bore extending from the pressure chamber 6 to the free space 8. The tube section 14 is movably guided and sealed in this bore 15 so as to prevent any pressure fluid from flowing from the pressure chamber 6 into the free space 8. It is also possible to pass a feed line round the free space, for example using elastic pressure hoses.

It may be desirable to restrict the flexibility of the bridge-shaped head portion 5 at certain sections along the gap between the co-operating rollers. This can be achieved by suitable shaping of the bridge-shaped head portion, or else some of the flux of the force which is to be transmitted may be directed in the direction of the line of action 4 of the force through the free space 8 in order to support the bridge-shaped head portion 5 or to limit the deflection of the head portion. To achieve this, a surface of the tube section 14 which is hydrostatically effective in relation to the pressure chamber 6, in the support members in FIGS. 2 and 4, may be made in different sizes. Thus, the tube section 14 in FIG. 2 has a relatively smaller hydrostatically effective surface 16 than the tube section 14 in FIG. 4. Thus, in the embodiment according to FIG. 4, the flexibility of the head portion 5 is more restricted than in the embodiment according to FIG. 2. In the embodiment according to FIG. 3, where the head portion 5 is a so-called guide shoe which supports the roller shell via a hydrodynamically formed film of fluid, the head portion 5 is additionally supported by a piston-like part 17, i.e. its flexibility is restricted thereby. This part 17 is mounted in a bore 18, whilst a rod 19, like a piston rod, extends to the head portion 5 and transmits that part of the pressure in the pressure chamber 6 which is absorbed by the piston-like part 17 to the head portion 5. FIG. 3 also shows that the bore 18 can be made in different sizes by using packings 20 of various sizes. The diameter of the part 17 must then be matched to the particular diameter of the bore 18.

It would also be possible to limit the flexibility of the head portion 5 in some other way, for example by mounting elastic supports in the free space itself. Such supports could be springs or elastomeric members. In the case of a free space 8 sealed off from the environment, it would also be possible to pass some of the pressure fluid from the pressure chamber 6 into the free space 8 by means of an adjustable throttle line, in order to limit the flexibility of the head portion by a certain build-up of pressure in the free space.

The invention applies to all support members. In the case of individual support members arranged along the gap between the co-operating rollers, it makes no difference whether the head portion is round or rectangular in outline. The same applies to so-called support strips provided as the sole support member over the entire length of the gap along the roller shell.

I claim:

1. Support member which is provided between a stationary carrier and a roller shell arranged so as to be rotatable about the carrier, the support member being intended to support this roller shell by being designed to receive a force acting radially from the carrier towards the roller shell and transmit this force to the shell via a head portion of the support member facing the roller shell and a film of fluid provided between the head portion and the roller shell; the head portion having a central flexible part which bridges an underlying free space in the support member and which is flanked by marginal parts spaced laterally from the line of action of said radially acting force; and the support member being constructed to transmit at least the main part of said radially acting force through said marginal parts of the head portion so that the central bridging part is free to deflect radially as needed to accommodate changes in the diameter of the shell and thereby prevent such changes from adversely affecting said fluid film.

2. Support member according to claim 1, in which the free space is tunnel-shaped, extends through the support member parallel to the axis of the carrier and is open at both ends.

3. Support member according to claim 1, in which the support member is subdivided, a first part being the head portion which is bridge-shaped and is mounted so as to be convex at right angles to the longitudinal axis of the carrier, and a second part of the support member being adapted to receive the force proceeding from the carrier and support the first part, namely the head portion, so that the free space in the support member is bounded by the first part and second part and is defined therebetween.

4. Support member according to one of the preceding claims, which is a hydrostatic support member with at least one hydrostatic pocket in the head portion, which is connected, via a feed line passing through the support member, to a hydrostatic pressure chamber in the carrier which serves to actuate the support member; a feed line passes through or around the free space to the pressure chamber and is constructed so as to adapt positively to the deflections of the head portion.

5. Support member according to claim 4, in which the feed line is housed in a tube section which is attached to the head portion and passes through the free space back to the pressure chamber whilst in the support member there is provided, for the tube section, a bore extending from the pressure chamber to the free space, the tube section being movably guided and sealed in this bore so as to prevent any flow from the pressure chamber into the free space.

6. Support member according to claim 1 which includes means for transmitting some of said radially acting force through the free space along the direction of action of that force, whereby said central part of the head portion is supported so as to limit its deflection.

* * * * *